United States Patent [19]

Lapointe

[11] 4,162,769

[45] Jul. 31, 1979

[54] WHOLE TREE CHIPPER

[75] Inventor: Joseph A. Lapointe, Montreal, Canada

[73] Assignee: Domtar Inc., Montreal, Canada

[21] Appl. No.: 874,795

[22] Filed: Feb. 3, 1978

Related U.S. Application Data

[63] Continuation-in-part of Ser. No. 855,073, Nov. 25, 1977, which is a continuation-in-part of Ser. No. 677,317, Apr. 15, 1976, abandoned.

[51] Int. Cl.² .................. B02C 18/22; B02C 23/08
[52] U.S. Cl. ..................... 241/68; 144/174; 241/93
[58] Field of Search ............. 241/68, 92, 93; 144/174, 323

[56] References Cited

U.S. PATENT DOCUMENTS

| | | | |
|---|---|---|---|
| 3,875,984 | 4/1975 | Plough | 241/93 X |
| 4,009,837 | 3/1977 | Schnyder | 241/93 |
| 4,077,450 | 3/1978 | Ackerman | 241/93 X |

OTHER PUBLICATIONS

Nicholson Manf. Co., in "Pulp and Paper", Dec. 1977, p. 70.
Arasmith Production in "Pulpwood" Production, Mar. 1973, pp. 32–33.

Primary Examiner—Howard N. Goldberg
Attorney, Agent, or Firm—C. A. Rowley

[57] ABSTRACT

A whole tree chipper composed of a housing encasing a rotor formed by a pair of substantially identical axially aligned frustro-conical hollow discs having their minimum diameter ends connected together and provided with at least one knife on each disc is disclosed. A slot extends through each disc adjacent each knife, for directing chips cut by the knife through the disc into a chip chamber located at the adjacent axial end of the housing. The rotor is rotated about the said axially aligned axes of the pair of discs and wood in the form of whole tree sections, is advanced longitudinally through an inlet spout which extends through the peripheral wall of the housing toward the conical faces of the discs forming the rotor. A debris chamber extends circumferentially of the rotor in said housing between the inlet spout and a debris outlet. Preferably a deflector is provided in the debris chamber to deflect debris toward the larger diameter ends of the discs into a position to be engaged by a set of paddles mounted on the larger diameter ends of each disc in a position to pass through the debris chamber and eject debris through the debris outlet. A chip outlet is provided from each of the chip chambers in the housing for ejecting chips from the chipper. The chipper thus ejects cut chips separately from debris which includes twigs and branches etc.

12 Claims, 5 Drawing Figures

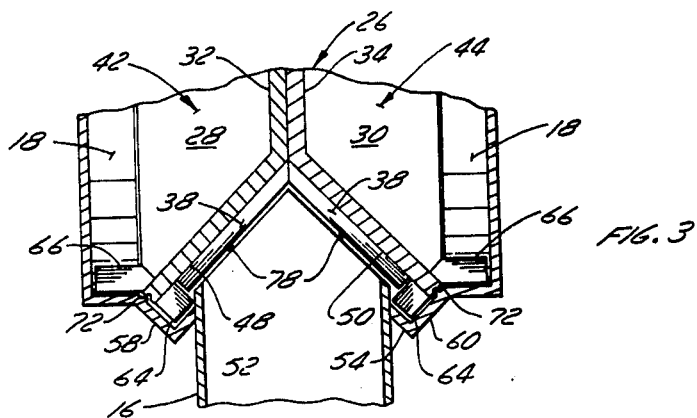
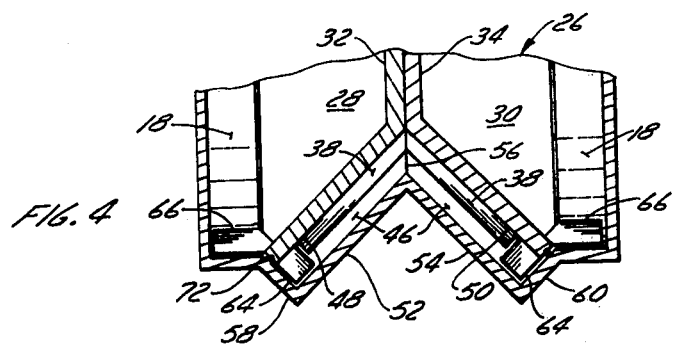
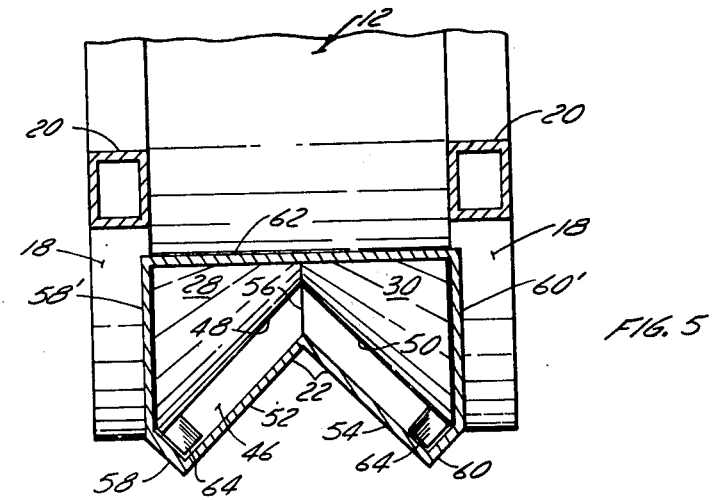

WHOLE TREE CHIPPER

This application is a Continuation-in-Part of U.S. Application No. 855,073 filed on Nov. 25, 1977, which in turn is a Continuation-in-Part of U.S. Application 677,317 filed Apr. 15, 1976 (now abandoned).

FIELD OF THE INVENTION

The present invention relates to a conical disk or V-drum chipper for processing whole trees while simultaneously separating debris including twigs and the like from chips as the chips are cut.

BACKGROUND OF THE INVENTION

The chips from whole trees and similar material provide an inexpensive source of fibre which many pulp mills are now using in varying proportions in combination with regular chips. Chips from whole trees generally contain significant amounts of long twigs or branches that cause costly handling problems, for example, hang up in chip bins, metering valves etc., and the use of these chips is therefore restricted.

Conventional V-drum chippers used to chip whole tree include a substantially cylindrical housing containing a V-drum rotor (formed by a pair of axially aligned substantially identical frustro-conical hollow disc having their smaller diameter ends connected together to form the rotor). Each of the discs of the rotor is provided with knives and slots therethrough adjacent the knives for passage of chips cut by the knives through the discs into chip chambers provided one at each end of the rotor. The chips are ejected from the chip chamber by suitable paddles formed at the larger diameter end of each of the discs. Twigs or branch stems or other debris that do not pass through the discs are directed into the chamber and ejected with the chips. No simple and effective means has been provided for separating this debris from the chips in the V-drum chipper.

The above identified Continuation-in-Part Application No. 855,073 discloses a disc type chipper wherein the chipper disc divides the housing into a front chamber and a rear chamber. In this arrangement the debris including the twigs and branches not chipped by the knives are moved into the front chamber and ejected through a debris outlet leading from the front chamber while the cut material (chips) passes through slots in the disc into a chip chamber and is ejected separately from the housing to a chip outlet.

It has also been proposed to separate dirt and loose bark in a drum chipper designed to chip short lengths of large diameter logs. In this chipper the short lengths are fed radially (longitudinal axis of the log and of the drum are aligned) and the knives cut substantially parallel to the grain of the wood to cut chips which pass into the drum. This device is totally unsuitable for chipping of whole trees.

BRIEF DESCRIPTION OF THE INVENTION

It is the object of the present invention to provide a conical disc or V-drum chipper wherein chips and debris are separated within the housing as the chips are cut.

Broadly the present invention relates to a whole tree chipper comprising a housing having a rotor therein, said rotor being formed by a pair of substantially identical axially aligned frustro-conical hollow discs having their minimum diameter ends connected together, at least one knife mounted on the conical outer face of each disc, a slot through each said conical face adjacent each said knife for permiting chips cut by said knife to pass through said conical discs to a chip chamber formed in said housing, means to rotate said rotor about said axially aligned axes of said pair of discs; an inlet spout through a peripheral wall of said housing; means for feeding tree lengths with twigs and branches thereon substantially axially through said inlet spout against said conical faces of said rotor; a debris chamber in said housing extending circumferentially of said rotor between said inlet spout and a debris outlet from said chipper; and a chip outlet from said housing to eject chips from each of said chip chambers, whereby chips are ejected from said chipper separated from debris which includes at least some of said twigs and branches entering with said tree sections.

Preferably deflector means are provided in said debris chamber to deflect debris to the larger diameter axial ends of the discs and paddles are provided adjacent the larger diameter axial end of each of said disc projecting outward from said outer conical faces of said discs; said paddles passing through said debris chamber for ejecting debris from said chamber through said debris outlet.

BRIEF DESCRIPTION OF THE DRAWINGS

Further features, objects and advantages will be evident from the following detailed description of the preferred embodiments of the present invention taken in conjunction with the accompanying drawings in which:

FIG. 3 is a section along the line 3—3 of FIG. 2.
FIG. 4 is a section along the line 4—4 of FIG. 2.
FIG. 5 is a section along the lines 5—5 of FIG. 2.

DESCRIPTION OF THE PREFERRED EMBODIMENTS

Figure 1:
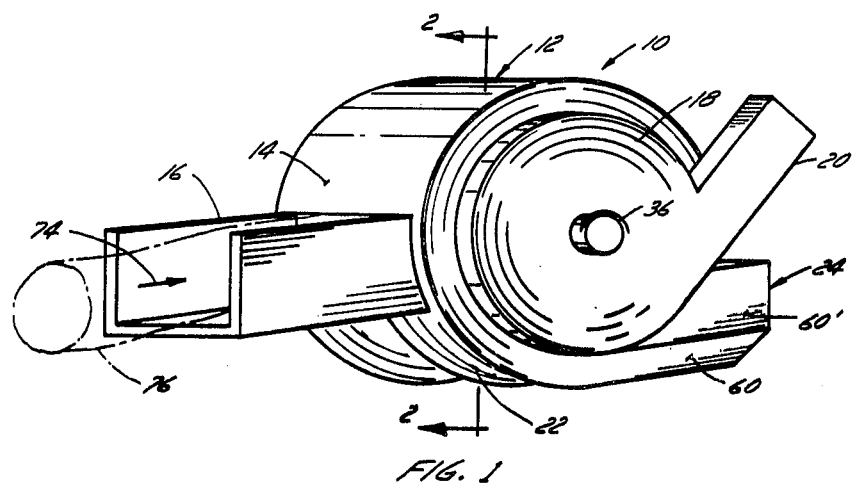
FIG. 1 is a schematic isometric view of a chipper incorporating the present invention.

The chipper 10 is composed of housing 12 having a pheripheral wall 14 with an inlet spout 16 extending therethrough to permit whole trees to be fed longitudinally into the chipper. Each axial end of the housing 12 is formed into a chip chamber 18 having a tangential outlet 20 for ejecting chips cut by the chipper from the housing.

The peripheral wall 14 in the area leading the inlet spout 16 in the direction of rotation of the rotor (will be described hereinbelow) is preferably provided with means to deflect debris toward the larger diameter ends of the rotor. In the illustrated arrangement the deflector means is in the form of a substantially V-shaped wall as indicated at 22 which deflects the debris toward the larger axial ends of the rotor thereby to facilitate the ejection of twigs and debris through the debris outlet 24 which extend substantially tangentially from the peripheral wall 14.

A rotor 26 (see FIGS. 2, 3, 4 & 5) formed by a pair of substantially identical axially aligned hollow frustro-conical discs 28 and 30 having their minimum diameter ends 32 and 34 secured together is contained within the housing 12. The rotor 26 is rotably mounted on shaft 36 (see FIG. 1) aligned with the axes of the discs 28 and 30.

Each of the discs 28 and 30 is provided with substantially radially extending knives generally indicated at 38 and slots 40 positioned relative to the knives so that the chips cut by each knife 38 pass through a slot 40 into the hollow interior 42 or 44 of the discs 28 or 30 respectively and into one of the chip chamber 18 at each end of the chipper. The knives 38 substantially uniformly project out from the conical outer surfaces of the discs 28 and 30 by a distance determined primarily by chip length (generally about ½ inch from the surface).

Figure 2:
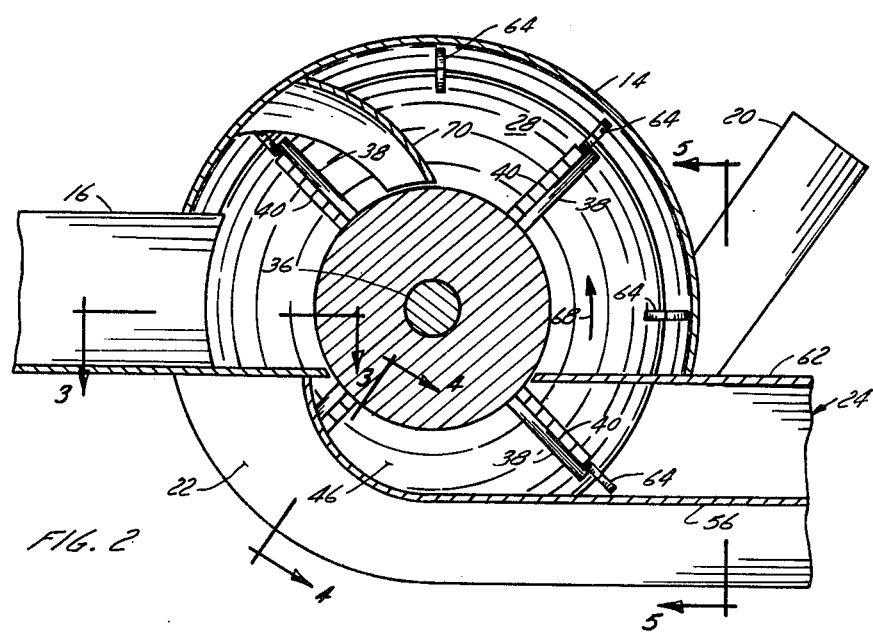
FIG. 2 is a section along the line 2—2 of FIG. 1.

A debris chamber 46 is formed in the housing 12 between the V-shaped portion 22 of the peripheral wall 12 and the rotor 26 as shown in FIGS. 2, 4 and 5 and extends to the debris outlet 24. Two walls of the chamber 46 are formed by the outer conical faces 48 and 50 of the discs 28 and 30 respectively, and a pair of opposed or outer walls 52 and 54 preferably substantially parallel to the faces or walls 48 and 50 and meeting at an apex 56 i.e. the angle at the apex 56 is substantially equal to the angle between the outer faces 48 and 50. These walls 52 and 54 provide a pair of bottom walls for the chamber 46 which deflect debris including twigs and the like to slide towards the ends of the chamber 46 defined by the end walls 58 and 60 respectively.

Chamber 46 exits tangentially from the housing 12 via a debris outlet 24 which is further defined by a pair of side walls 58' and 60' and a top wall 62. The top wall 62 extends into the chipper housing and has its side edges spaced from and substantially parallel to the faces 48 and 50 of the discs 28 and 30 (see FIGS. 2 and 5). The space between the side edge of the top wall 62 and the faces 48 and 50 of the rotor 26 may be slightly less than the spacing between the bottom of the inlet spout (anvil) and the said conical faces 48 and 50.

Mounted on the outer faces 48 and 50 of the discs 28 and 30 beyond the knives 38 are a first set of circumferential spaced paddles 64 which are contained within the debris chamber 46 and function to propell debris out through the debris outlet 24 as will be described hereinbelow.

A second set of circumferentially spaced paddles 66 project from the inner surface of the hollow conical discs 28 and 30 adjacent their maximum diameter end into the chip chambers 19 and function to eject the chips from the chambers 18 through the chip outlets 20.

Positioned in the housing 12 immediately before the inlet 16 in the direction of travel of the discs 28 and 30 as indicated by the arrow 68 is a V-shaped plow 70 which directs debris, that carries past the top wall 62, toward the end walls 58 and 60 of the debris chamber (walls 58 and 60 extend completely around the periphery of the housing). The V-shaped plow 70 flares toward the maximum diameter ends of the discs 28 and 30 and in the direction of movement of the peripheres of the discs 28 and 30 as indicated in FIG. 2. This plow 70 is not essential and may if desired be eliminated. A plow similar to plow 70 but positioned properly in the debris chamber could be used to deflect debris toward the larger diameter ends of the rotor but it would not be as effective as the V-shaped section 22 of the housing and for this reason the V-shaped section formed by the walls 52 and 54 is preferred.

A suitable seal may be provided between debris chamber 46 and the adjacent chip chambers 18, this seal may take the form of a labyrinth as shown for example at 72 i.e. a projection extends in from the wall 56 or 58 and is received within a grove provided on the end wall of the conical discs 28 or 30.

To operate the chipper as described hereinabove, the tree lengths, shown in phantom lines 76 with branches and twigs attached, are fed axially into the chipper as indicated schematically in FIG. 1 via the arrow 74. Knives 38 on the discs 28 and 30 forming the rotor 26 engage and chip the log thereby to shape the leading end of the log into a substantially V-shape. The chips cut by the knives 38 pass through the respective slots 40 and travel directly to the adjacent chip chamber 18 i.e. the angle of the conical disc is such that the trajectory of the chips cut by either disc will carry beyond the axial end of the disc into the adjacent chamber 18. The chips are driven from the chamber 18 and out through the outlets 20 by the paddles 66.

Whole trees include twigs and branch sections and have grit, dirt and other debris attached thereto. The branches are not all chipped and unchipped portions of branches and twigs are moved through the space 78 between the free end of the inlet spout adjacent the rotor (the anvil) and the surfaces 48 and 50 of the rotor into the debris chamber 46. Forces acting on this debris material tend to throw it against the surfaces 52 and 54 which deflect same towards the walls 58 and 60 into a position to be engaged by the paddles 64 and be positively ejected through the debris outlet 24.

In order for twigs and the like material of elongated shape to enter the chamber 46 they must pass through the space or passage 78 between the free edge or anvil of the inlet spout 16 adjacent the rotor and the conical faces of the rotor (some may pass between the side edges of the spout 16 and the rotor). To pass through this passage the branches or twigs (assuming they have a high length to diameter ratio as would normally be the case) must be oriented so their smallest dimension is substantially perpendicular to the surface of the rotor. The action of the knives and of the faces 48 and 50 tend to align a significant number of the twigs and the like with the surfaces 48 and 50 so that they may pass through the clearance or passage 78 into the chamber 46 and be ejected through the outlet 24 via the paddles 60.

Modifications may be made without departing from the spirit of the invention as defined in the appended claims.

I claim:

1. A whole tree chipper comprising a housing having a rotor therein, said housing including a circumferential wall and chip chambers formed at each axial end thereof; said rotor being formed by a pair of substantially identical axially aligned frustro-conical hollow discs connected together at their minimum diameter axial ends and rotatable about their common axis, at least one knife projecting from the conical outer face of each disc; a slot through said conical outer face adjacent said knife for directing chips cut by said knife to the interior of said hollow disc and into said chip chamber at the adjacent axial end of said rotor; means to rotate said rotor; an inlet through said circumferential wall for feeding tree lengths with twigs and branches thereon substantially longitudinally through said inlet and against said conical faces of said rotor; a debris outlet through said circumferential wall; a debris chamber in said housing between said circumferential wall and said conical faces of said discs, means separating said debris chamber from said chip chambers, said debris chamber extending between said inlet and said debris outlet, said debris outlet connected with said debris chamber, means on said rotor for ejecting debris from said debris chamber through said debris outlet, and a chip outlet from each of said chip chambers for ejecting the chips from said said chip chamber whereby chips are ejected from said chipper separate from debris, said debris including at least some of said twigs and branches.

2. A whole tree chipper as defined in claim 1 further comprising deflecting means in said debris chamber for deflecting said debris toward the larger diameter axial ends of said discs.

3. A whole tree chipper as defined in claim 2 wherein said deflection means comprises a pair of outer walls of said debris chamber meeting at an apex substantially aligned with the minimum diameter axial ends of said discs.

4. A whole tree chipper as defined in claim 3 wherein the angle formed at the apex between said outer walls is substantially equal to the angle formed between said conical outer faces of said disc.

5. A chipper as defined in claim 2 wherein said means for ejecting debris comprises; a set of circumferentially spaced paddles on said rotor beyond said knives and adjacent the larger diameter end of each of said conical discs, said paddles projecting outward from said outer conical faces of said discs, said paddles passing into said debris chamber adjacent the sides of said debris chamber and forcing debris from said debris chamber through said debris outlet.

6. A chipper as defined in claim 5 further comprising a second set of paddles on each of said discs; said second set of paddles projecting beyond the larger end of said frustro-conical discs and being contained within said chip chamber; said second set of paddles ejecting chips from each of said chip chambers.

7. A chipper as defined in claim 5 wherein said debris outlet comprises an extension of said debris chamber and is further defined by a pair of side walls and a top wall; said top wall projecting into said housing and being in close proximity to said outer conical faces of said discs.

8. A chipper as defined in claim 3 wherein said means for ejecting debris comprises a set of circumferentially spaced paddles mounted on said rotor beyond said knives and adjacent the larger diameter end of each of said conical discs; said paddles projecting outward from said outer conical faces of said discs, said paddles passing into said debris chamber adjacent the sides of said debris chamber and forcing debris from said debris chamber through said debris outlet.

9. A chipper as defined in claim 8 further comprising a second set of paddles on each of said discs; said second set of paddles projecting beyond the larger end of said frustro-conical discs and being contained within said chip chamber; said second set of paddles ejecting chips from each of said chip chambers.

10. A chipper as defined in claim 3 wherein said debris outlet comprises an extension of said debris chamber and is further defined by a pair of side walls and a top wall; said top wall projecting into said housing and being in close proximity to said outer conical faces of said discs.

11. A chipper as defined in claim 8 wherein said debris outlet comprises an extension of said debris chamber and is further defined by a pair of side walls and a top wall; said top wall projecting into said housing and being in close proximity to said outer conical faces of said discs.

12. A chipper as defined in claim 4 wherein said means for ejecting debris comprises; a set of circumferentially spaced paddles on said rotor beyond said knives and adjacent the larger diameter end of each of said conical discs; said paddles projecting outward from said outer conical faces of said discs, said paddles passing into said debris chamber adjacent the sides of said debris chamber and forcing debric from said debris chamber through said debris outlet.

* * * * *